United States Patent
Lee

(10) Patent No.: US 9,246,673 B2
(45) Date of Patent: Jan. 26, 2016

(54) TASTE-BASED AUTHENTICATION TO SECURELY SHARE DATA

(75) Inventor: Mun-Kyu Lee, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 217 days.

(21) Appl. No.: 13/703,133

(22) PCT Filed: Dec. 28, 2011

(86) PCT No.: PCT/KR2011/010253
§ 371 (c)(1),
(2), (4) Date: Dec. 10, 2012

(87) PCT Pub. No.: WO2013/100224
PCT Pub. Date: Jul. 4, 2013

(65) Prior Publication Data
US 2013/0173911 A1    Jul. 4, 2013

(51) Int. Cl.
*H04L 9/08* (2006.01)
*H04L 9/32* (2006.01)

(52) U.S. Cl.
CPC ........ *H04L 9/08* (2013.01); *H04L 9/321* (2013.01); *H04L 2209/42* (2013.01)

(58) Field of Classification Search
CPC ........................................... H04L 9/08
See application file for complete search history.

(56) References Cited

U.S. PATENT DOCUMENTS

| | | |
|---|---|---|
| 7,911,335 B1 | 3/2011 | Brady, Jr. |
| 2005/0149730 A1 | 7/2005 | Aissi et al. |
| 2007/0249352 A1 | 10/2007 | Song et al. |
| 2010/0017603 A1 | 1/2010 | Jones |
| 2011/0078453 A1* | 3/2011 | Mueck et al. ............. 713/179 |
| 2011/0202767 A1* | 8/2011 | Hui et al. .................. 713/168 |
| 2013/0067216 A1* | 3/2013 | Tanner et al. ............. 713/155 |

FOREIGN PATENT DOCUMENTS

KR    20020033894 A    5/2002

OTHER PUBLICATIONS

Juels, A. et al, A fuzzy vault scheme, RSA Laboratories, pp. 1-18, Bedford, MA, MIT Laboratory for Computer Science, Cambridge, MA.

Ratha, N., et al, Generating cancelable fingerprint templates, IEEE Transactions on Pattern Analysis and Machine Intelligence, Apr. 2007, pp. 561-572, vol. 29, No. 4, Computer.org/publications/dlib.

Clancy, T.C., et al., Secure smartcard—based fingerprint authentication, WBMA '03, Nov. 8, 2003, pp. 1-10, Berkeley, California, USA.

Sahai, A., et al., Fuzzy identity-based encryption, EUROCRYPT 2005, pp. 457-473, International Association for Cryptologic Research.

Korean Intellectual Property Office, International Search Report and Written Opinion of the International Searching Authority for PCT/KR2011/010253, mailed on Sep. 26, 2012.

* cited by examiner

*Primary Examiner* — Brandon Hoffman
*Assistant Examiner* — Nega Woldemariam

(57) ABSTRACT

Examples are disclosed for transforming a multi-dimensional attribute value for a taste related to an area of interest for a user of a computing device and encrypting or decrypting a ciphertext using the transformed multi-dimensional attribute value in order to securely share data with another computing device.

13 Claims, 10 Drawing Sheets

Fault-Tolerant Encryption (FTE) Scheme 500

Fault-Tolerant Decryption (FTD) Scheme 700

900 A computer program product.

902 A signal bearing medium.

904 instructions to be implemented at a first computing device, which, when executed by logic, cause the logic to:

receive a first ciphertext and a transformation parameter from a server, the first ciphertext and the transformation parameter generated by a second computing device;

receive a first taste for a first user of the first computing device, the first taste related to an area of interest and having a multi-dimensional attribute value;

transform the multi-dimensional attribute value for the first taste to a one-dimensional attribute value using the transformation parameter;

decrypt the first ciphertext using the one-dimensional attribute value in order to obtain a pseudonym identifying the second computing device and to obtain a session key to be used with the pseudonym to securely share data with the second computing device;

determine a quality of the decryption; or initiate a security session with the second computing device to share data based, at least in part, on the determined quality of the decryption exceeding a threshold value.

| 906 a computer-readable medium. | 908 a recordable medium. | 910 a communications medium. |

FIG. 9

TASTE-BASED AUTHENTICATION TO SECURELY SHARE DATA

CROSS-REFERENCE TO RELATED APPLICATION

This Application is the U.S. National Stage filing under 35 U.S.C. §371 of PCT Application No. PCT/KR11/10253 filed on Dec. 28, 2011.

BACKGROUND ART

Unless otherwise indicated herein, the approaches described in this section are not prior art to the claims in this application and are not admitted to be prior art by inclusion in this section.

Securely sharing data between computing devices may be a desirable objective of users of computing devices. Also, users may want to share data with other users based on similar preferences or tastes to an area of interest. These users may also want to maintain an acceptable level of privacy and/or security from other entities while sharing the data. These other entities may include unwanted advertisers, spammers or malicious actors.

DISCLOSURE

In various embodiments, the present disclosure describes example methods for encrypting a ciphertext and sending the ciphertext to a server. The methods may include generating a first pseudonym to at least temporarily identify a first computing device associated with a first user having a first taste related to an area of interest. The first taste may have a multi-dimensional attribute value. A first session key may then be generated to be used with the pseudonym to securely share data maintained on the first computing device with one or more other computing devices. A transformation parameter may also be generated and then used to transform the multi-dimensional attribute value for the first taste to a one-dimensional attribute value. The pseudonym and the session key may then be encrypted using the one-dimensional attribute value in order to generate a first ciphertext. In some examples, the first ciphertext and the transformation parameter may be sent to a server accessible to both the first computing device and the one or more other computing devices. For these examples, the server may maintain the first ciphertext and the transformation parameter.

In various embodiments, the present disclosure also describes example methods for decrypting a ciphertext and initiating a security session. The methods may include a first computing device receiving a first ciphertext and a transformation parameter from a server. A second computing device may have generated the ciphertext and the transformation parameter. A first taste for a first user of the first computing device may also be received. The multi-dimensional attribute value for the first taste may then be transformed to a one-dimensional attribute value using the transformation parameter. Also, the first ciphertext may be decrypted using the one-dimensional attribute value in order to obtain a pseudonym identifying the second computing device and to obtain a session key to be used with the pseudonym to securely share data with the second computing device. In some examples, a quality of the decryption may then be determined. For these examples, a security session with the second computing device to share data may be initiated based, at least in part, on the determined quality of the decryption exceeding a threshold value.

In various embodiments, the present disclosure also describes example devices to encrypt a ciphertext and send the ciphertext to a server. The example devices may have an encryption manager that has logic. The logic may be configured to generate a first pseudonym to at least temporarily identify a first computing device associated with a first user having a first taste related to an area of interest. The first taste may have a multi-dimensional attribute value. The logic may also be configured to generate a first session key. The first session key may be used with the pseudonym to securely share data maintained on the first computing device with one or more other computing devices. The logic may also be configured to generate a transformation parameter that may then be used to transform the multi-dimensional attribute value for the first taste to a one-dimensional attribute value. The logic may also be configured to encrypt the pseudonym and the session key using the one-dimensional attribute value in order to generate a first ciphertext. In some examples, the logic may be configured to send the first ciphertext and the transformation parameter to a server accessible to both the first computing device and the one or more other computing devices. For these examples, the server may maintain the first ciphertext and the transformation parameter.

In various embodiments, the present disclosure also describes an example computing device to decrypt a ciphertext and initiate a security session. The example computing device may include an application and a decryption manager. The application may have logic to generate a taste for a user of the computing device. The first taste may be related to an area of interest and may have a multi-dimensional attribute value. The encryption manager may have logic configured to receive a ciphertext and a transformation parameter from a server, the ciphertext and the transformation parameter may have been generated by another computing device. The encryption manager may also have logic configured to receive the multi-dimensional attribute value from the application and transform the multi-dimensional attribute value for the taste to a one-dimensional attribute value using the transformation parameter. The encryption manager may also have logic configured to decrypt the ciphertext using the one-dimensional attribute value in order to obtain a pseudonym identifying the other computing device and to obtain a session key to be used with the pseudonym to securely share data with the other computing device. In some examples, the encryption manager may also have logic configured to determine a quality of the decryption and initiate a security session with the other computing device to share data based, at least in part, on the determined quality of the decryption exceeding a threshold value.

In various embodiments, the present disclosure also describes example computer program products. In some examples, the computer program products may include a signal bearing medium having instructions to be implemented at a first computing device. The instructions, when executed by logic, may cause the logic to receive a first ciphertext and a transformation parameter from a server. A second computing device may have generated the ciphertext and the transformation parameter. The instructions may also cause the logic to receive a first taste for a first user of the first computing device. The first taste may be related to an area of interest and may have a multi-dimensional attribute value. The instructions may also cause the logic to transform the multi-dimensional attribute value for the first taste to a one-dimensional attribute value using the transformation parameter. The instructions may also cause the logic to decrypt the first ciphertext using the one-dimensional attribute value in order to obtain a pseudonym identifying the second computing device and to obtain a session key to be used with the pseudonym to securely share data with the second computing device. In some examples, the instructions may cause the logic to determine a quality of the decryption and initiate a security session with the other computing device to share data based, at least in part, on the determined quality of the decryption exceeding a threshold value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings:

FIG. 9 illustrates a block diagram of an example computer program product; and

DETAILED DESCRIPTION

Figure 1:
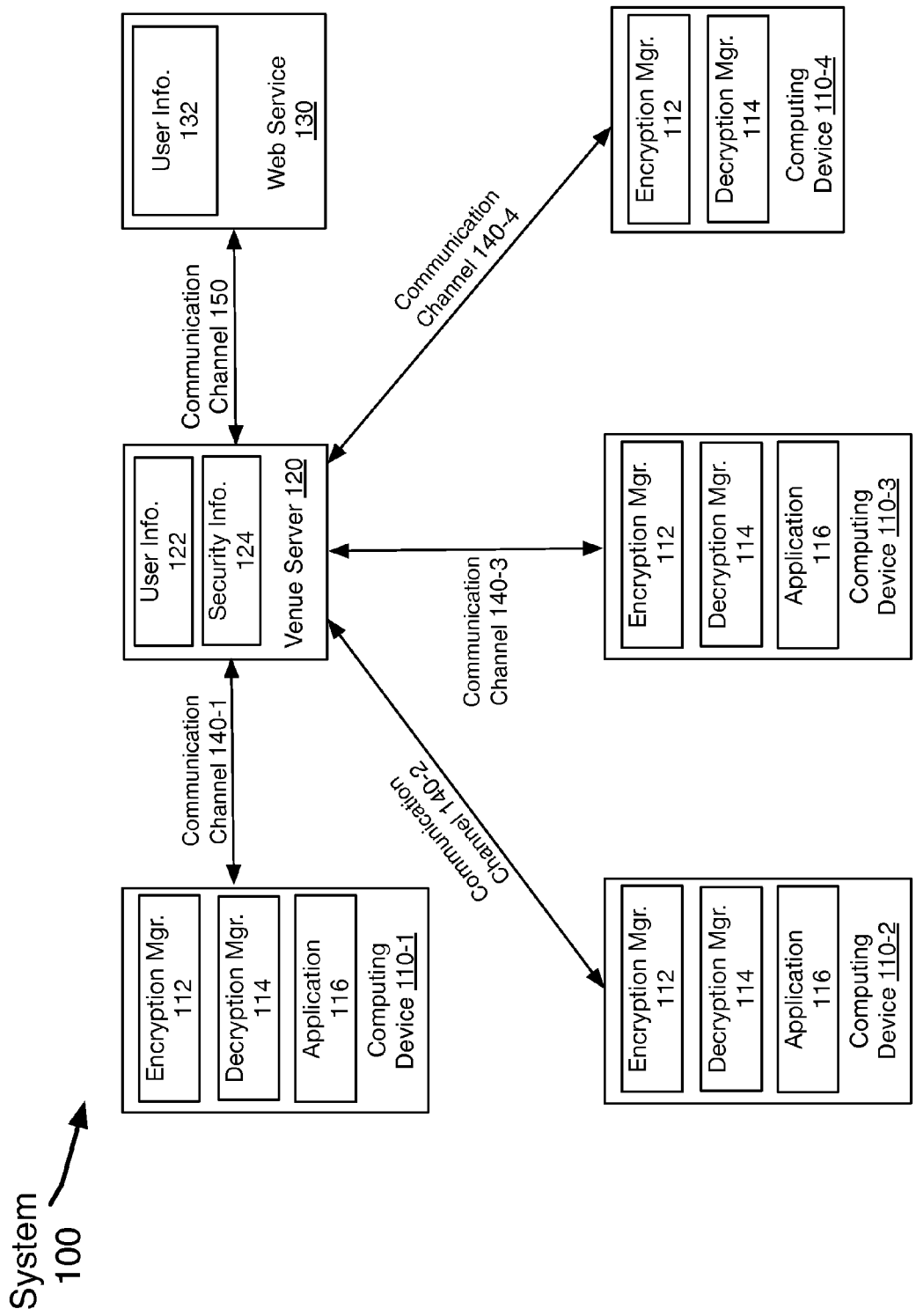
FIG. 1 illustrates an example system for sharing data between computing devices.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products for taste-based authentication in order to securely share data between computing devices.

As contemplated in the present disclosure, computing device users may want to privately and/or securely share data with other computing device users based on similar preferences or tastes to an area of interest. Also, these users may want to find other users having similar tastes in the area of interest without enabling other entities such as unwanted advertisers, spammers or malicious actors to also share data. As a result, finding and then securely sharing data with a user having similar preferences or tastes while excluding unwanted advertisers, spammers or malicious actors may be problematic.

In some examples, methods are implemented for generating a first pseudonym to at least temporarily identify a first computing device associated with a first user having a first taste related to an area of interest. The first taste may have or be represented by a multi-dimensional attribute value. A first session key may then be generated to be used with the pseudonym to securely share data maintained on the first computing device with one or more other computing devices. A transformation parameter may also be generated and then used to transform the multi-dimensional attribute value for the first taste to a one-dimensional attribute value. The pseudonym and the session key may then be encrypted using the one-dimensional attribute value in order to generate a first ciphertext. In some examples, the first ciphertext and the transformation parameter may be sent to a server accessible to both the first computing device and the one or more other computing devices. For these examples, the server may maintain the first ciphertext and the transformation parameter. The one or more other computing devices may then receive both the first ciphertext and the transformation parameter. The one or more other computing devices may then decrypt the first ciphertext and use the transformation parameter to determine a quality of the decryption of the first ciphertext. Based at least in part on the determined quality of the decryption of the first ciphertext, the one or more other computing devices may initiate a security session with the first computing device to securely share data.

FIG. 1 illustrates an example system 100 for sharing data between computing devices, arranged in accordance with at least some embodiments of the present disclosure. As shown in FIG. 1, system 100 includes computing devices 110-1 to 110-4, a venue server 120 and a web service 130. In some examples, as shown in FIG. 1, communication channels 140-1 to 140-4 may communicatively couple computing devices 110-1 to 110-4, respectively, to venue service 120. Although four computing devices are shown in FIG. 1, the present disclosure is not limited to four computing devices but may include any number of computing devices communicatively coupled to venue server 120. Also, as shown in FIG. 1, communication channel 150 may communicatively couple venue server 120 to web service 130.

According to some examples, as shown in FIG. 1, computing devices 110-1 to 110-4 may separately include an encryption manager 112 and a decryption manager 114. As described in more detail below, encryption manager 112 and decryption manager 114 may include logic and/or features configured to securely share data based, at least in part, on taste-based authentication. Taste-based authentication may incorporate a taste related to an area of interest for a given user of a computing device (e.g., computing device 110-1). Also, as shown in FIG. 1, at least of portion of the computing devices separately include an application 116. For some examples, application 116 may include logic and/or features configured to generate the taste for the given user of the computing device.

In some examples, as shown in FIG. 1, venue server 120 may include user information 122 and security information 124. User information 122 may include venue-specific user information maintained by venue server 120. For example, a venue may be a commerce site (physical or virtual) via which users of computing devices may visit to possibly purchase an item (e.g., a book, a movie, an album, a song, clothing, a beverage, etc.). The venue-specific user information may include information gathered while the user of the computing device visits the venue (e.g., purchase history, search history, user demographic characteristics, etc.) and may be used to generate or determine a taste related to an area of interest for the user. Security information 124, as described more below, may include information maintained at or with venue server 120 that may be used to allow computing devices 110-1 to 110-4 to securely share data.

According to some examples, as shown in FIG. 1, web service 130 may include user information 132. User information 132 may include user-specific information associated with a user of a computing device. The user-specific information included in user information 132 may either augment or be used in lieu of venue-specific information included in user information 122 maintained by venue server 120. For example, user-specific information for a user of a given computing device may be included in user information 132. The user of the given computing device may have little to no prior purchase or search history with a venue associated with venue server 120. Venue server 120 may be configured to obtain or receive user-specific information for the user from web service 130 to augment any venue-specific user information maintained in user information 122.

According to some examples, a user of computing device 110-1 may either physically or virtually cause computing device 110-1 to enter a venue associated with venue server 120. For example, the venue may be a bookstore and once computing device 110-1 communicatively couples with venue server 120 via communication channel 140-1, computing device 110-1 may be deemed as entering the bookstore. As described in more detail below, encryption manager 112, decryption manager 114 or application 116 may be configured to securely share data maintained at or with computing device 110-1 with other computing devices also communicatively coupled to venue server 120 (e.g., computing device 110-4). Also as described in more detail below, the user of computing device 110-1 may have tastes related to an area of interest such as a particular genre of books. These tastes may be used to selectively and securely share data with users of other computing devices having similar tastes in the area of interest.

According to some examples, communication channels 140-1 to 140-4 or communication channel 150 may operate in accordance with one or more wired or wireless standards that enable computing devices 110-1 to 110-4, venue server 120 or web service 130 to communicatively couple. These wired or wireless standards may be described in one or one or more industry standards such as those associated with IEEE, 802.1, IEEE 802.11, IEEE 802.16, GSM, GPRS, EDGE, W-CDMA, HSPA, CDMA-2000, EV-DO, LTE or TD-LTE, although this disclosure is not limited to only the above-described wired or wireless standards.

Although not shown in FIG. 1, computing devices 110-1 to 110-4 may also establish separate communication channels either directly between each other or through venue server 120. In some examples, separate communication channels may be established upon setting up or establishing a security session in order to securely share data related to a similar area of interest. These separate communication channels may operate according to the above-described wired or wireless standards.

Figure 2:
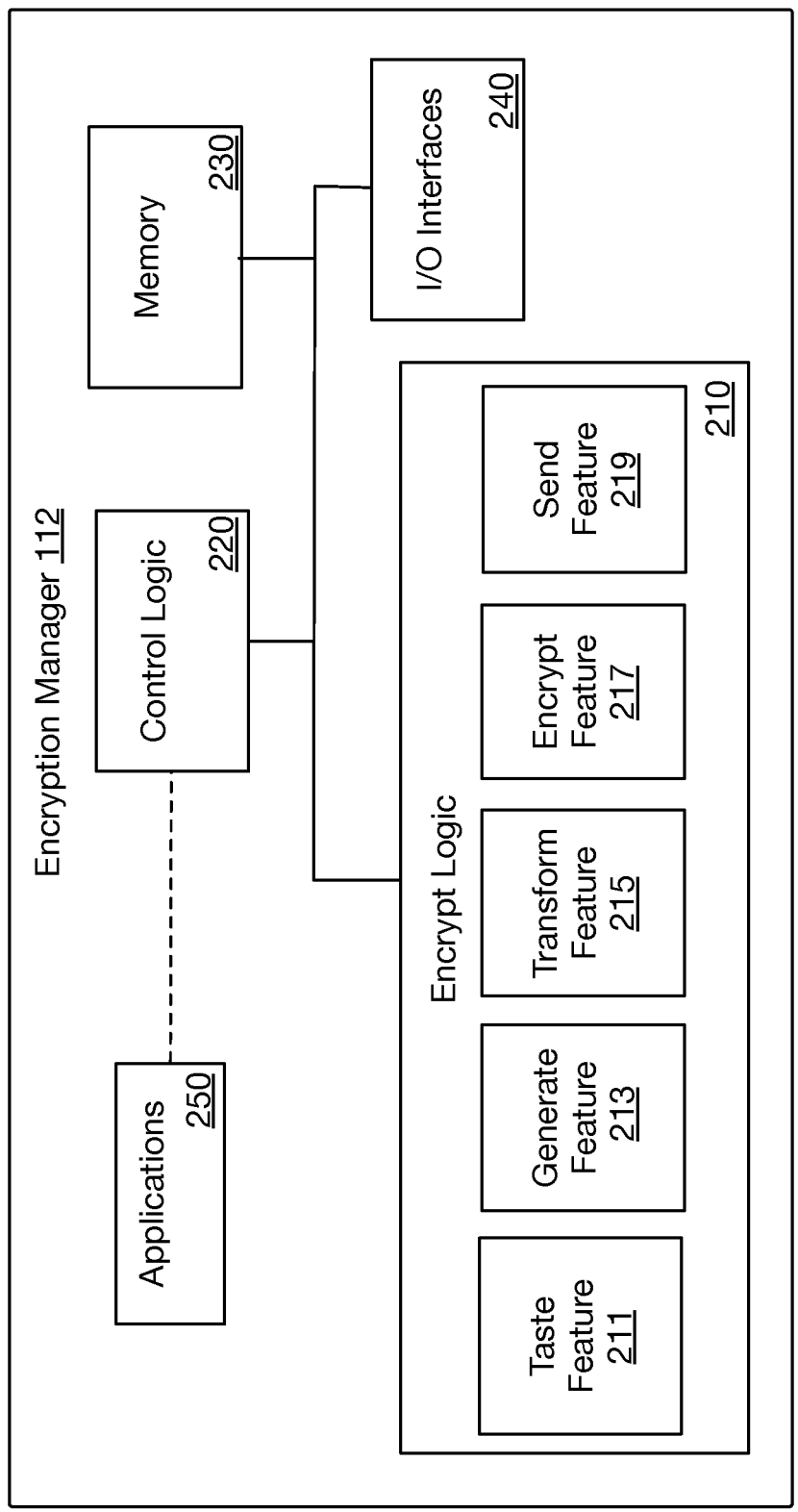
FIG. 2 illustrates a block diagram of an example architecture for an encryption manager.

FIG. 2 illustrates a block diagram of an example architecture for encryption manager 112, arranged in accordance with at least some embodiments of the present disclosure. As described above for system 100 in FIG. 1, computing devices 110-1 to 110-4 may include encryption manager 112. In some examples, encryption manager 112 includes features and/or logic configured or arranged to enable a computing device to communicatively couple to venue server 120 and securely share data with other computing devices also communicatively coupled to venue server 120.

The example encryption manager 112 of FIG. 2, includes encrypt logic 210, control logic 220, a memory 230, input/output (I/O) interfaces 240 and optionally one or more applications 250. As illustrated in FIG. 2, encrypt logic 210 may be coupled to control logic 220, memory 230 and I/O interfaces 240. Also illustrated in FIG. 2, optional applications 250 may be arranged in communication with control logic 220. Encrypt logic 210 may further include one or more of a taste feature 211, a generate feature 213, a transform feature 215, an encrypt feature 217, or a send feature 219, or any reasonable combination thereof.

In some examples, the elements portrayed in FIG. 2's block diagram are configured to support or enable encryption manager 112 as described in this disclosure. A given encryption manager 112 may include some, all or more elements than those depicted in FIG. 2. For example, encrypt logic 210 and control logic 220 may separately or collectively represent a wide variety of logic device(s) to implement the features of encryption manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, encrypt logic 210 includes taste feature 211, generate feature 213, transform feature 215, encrypt feature 217, or send feature 219. Encrypt logic 210 may be configured to use one or more of these features to perform operations. As described in more detail below, example operations may include using a computing device user's taste(s) related to an area of interest to generate a ciphertext. The operations may also include sending the ciphertext to a server (e.g., venue server 120) accessible to the computing device in order to securely share data with other computing devices that may also be accessible to the server.

In some examples, control logic 220 may be configured to control the overall operation of encryption manager 112. As described above, control logic 220 may represent any of a wide variety of logic device(s) configured to operate in conjunction with executable content or instructions to implement the control of encryption manager 112. In some alternate examples, the features and functionality of control logic 220 may be implemented within encrypt logic 210.

According to some examples, memory 230 is arranged to store executable content or instructions. The executable content or instructions may be used by control logic 220 and/or encrypt logic 210 to implement or activate features or elements of encryption manager 112. As described in more detail below, memory 230 may also be arranged to temporarily maintain information associated with generating a ciphertext using a computing device user's tastes related to an area of interest.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via a local wired and/or wireless communication medium or link between encryption manager 112 and elements resident on or located with a computing device such as computing devices 110-1 to 110-4 depicted in FIG. 1. I/O interfaces 240 may include interfaces that operate according to various communication protocols to communicate over the local wired or wireless communication medium or link (e.g., I2C, SMBus, SPI, PCI-Express, USB, etc). I/O interfaces 240 may also provide an interface between encryption manager 112 and elements located remote to the computing device. For example, as described above for FIG. 1, computing device 110-1 having encryption manager 112 may communicatively couple to venue server 120 via communication channel 140-1. Also, computing device 110-1 having encryption manager 112 may communicatively couple to computing devices 110-2 to 110-4 through venue server 120 and via communication channels 140-2 to 140-4 or through separately established communication channels. I/O interfaces 240, for example, include an interface configured to operate according to various wired or wireless communication protocols to allow encryption manager 112 to communicate via these communication channels. These wired or wireless communication protocols may include, but are not limited to, IEEE 802.1, IEEE 802.11, IEEE 802.16, GSM, GPRS, EDGE, W-CDMA, HSPA, CDMA-2000, EV-DO, LTE, TD-LTE.

In some examples, encryption manager 112 includes one or more applications 250 to provide instructions to control logic 220 and/or encrypt logic 210. These instructions, for example, may include instructions for encryption manager 112 to implement or use one or more of taste feature 211, generate feature 213, transform feature 215, encrypt feature 217, or send feature 219.

Figure 3:
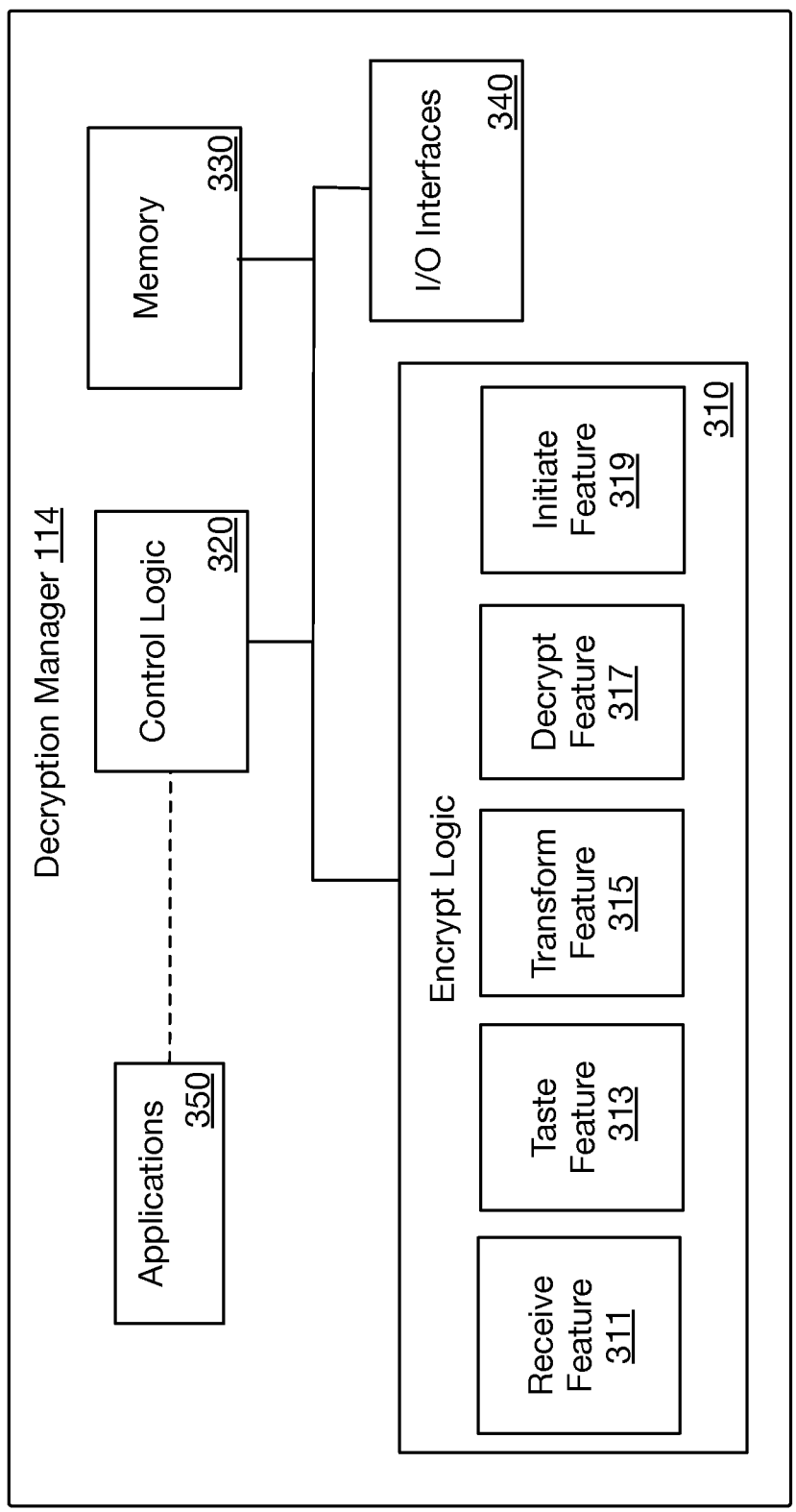
FIG. 3 illustrates a block diagram of an example architecture for a decryption manager.

FIG. 3 illustrates a block diagram of an example architecture for decryption manager 114, arranged in accordance with at least some embodiments of the present disclosure. As described above for system 100 in FIG. 1, computing devices 110-1 to 110-4 may include encryption manager 112. In some examples, decryption manager 114 includes features and/or logic configured or arranged to enable a computing device to communicatively couple to venue server 120 and initiate a security session with other computing devices communicatively coupled to venue server 120 to securely share data.

The example decryption manager 114 of FIG. 3 includes decrypt logic 310, control logic 320, a memory 330, input/output (I/O) interfaces 340 and optionally one or more applications 350. As illustrated in FIG. 3, decrypt logic 310 may be coupled to control logic 320, memory 330 and I/O interfaces 340. Also as illustrated in FIG. 3, optional applications 350 may be arranged in cooperation with control logic 320. Decrypt logic 310 may further include one or more of a receive feature 311, a taste feature 313, a transform feature 315, a decrypt feature 317, or an initiate feature 319, or any reasonable combination thereof.

In some examples, the elements portrayed in FIG. 3's block diagram are configured to support or enable decryption manager 114 as described in this disclosure. A given decryption manager 114 may include some, all or more elements than those depicted in FIG. 3. For example, decrypt logic 310 and control logic 320 may separately or collectively represent a wide variety of logic device(s) to implement the features of decryption manager 114. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 3, decrypt logic 310 includes receive feature 311, taste feature 313, transform feature 315, decrypt feature 317, or initiate feature 319. Decrypt logic 310 may be configured to use one or more of these features to perform operations. As described in more detail below, example operations may include decrypting a ciphertext received from a server (e.g., venue server 120) and initiating a security session to share data between computing devices based on a determined quality of the decrypted ciphertext.

In some examples, control logic 320 may be configured to control the overall operation of decryption manager 114. As described above, control logic 320 may represent any of a wide variety of logic device(s) configured to operate in conjunction with executable content or instructions to implement the control of decryption manager 114. In some alternate examples, the features and functionality of control logic 320 may be implemented within decrypt logic 310.

According to some examples, memory 330 is arranged to store executable content or instructions. The executable content or instructions may be used by control logic 320 and/or decrypt logic 310 to implement or activate features or elements of decryption manager 114. As described more below, memory 330 may also be arranged to temporarily maintain information associated with decrypting a ciphertext in order to initiate a security session to share data between computing devices. This information, for example, may include user taste information related to an area of interest for a user of a computing device including a decryption manager 114.

Memory 330 may include a wide variety of memory media including, but not limited to, one or more of volatile memory, non-volatile memory, flash memory, programmable variables or states, RAM, ROM, or other static or dynamic storage media.

In some examples, I/O interfaces 340 may provide an interface via a local wired and/or wireless communication medium or link between decryption manager 114 and elements resident on or located with a computing device such as computing devices 110-1 to 110-4 depicted in FIG. 1. I/O interfaces 340 may include interfaces that operate according to various communication protocols to communicate over the local wired or wireless communication medium or link (e.g., I2C, SMBus, SPI, PCI-Express, USB, etc). I/O interfaces 340 may also provide an interface between decryption manager 114 and elements located remote to the computing device. For example, as described above for FIG. 1, computing device 110-1 having decryption manager 114 may communicatively couple to venue server 120 via communication channel 140-1. Also, computing device 110-1 having decryption manager 114 may communicatively couple to computing devices 110-2 to 110-4 through venue server 120 and via communication channels 140-2 to 140-4 or through separately established communication channels. I/O interfaces 340, for example, include an interface configured to operate according to various wired or wireless communication protocols to allow decryption manager 114 to communicate via these communication channels. These wired or wireless communication protocols may include, but are not limited to, IEEE 802.1, IEEE 802.11, IEEE 802.16, GSM, GPRS, EDGE, W-CDMA, HSPA, CDMA-2000, EV-DO, LTE, TD-LTE.

In some examples, decryption manager 114 includes one or more applications 350 to provide instructions to control logic 320 and/or decrypt logic 310. These instructions, for example, may include instructions for decryption manager 114 to implement or use one or more of receive feature 311, taste feature 313, transform feature 315, decrypt feature 317, or initiate feature 319.

Figure 4:
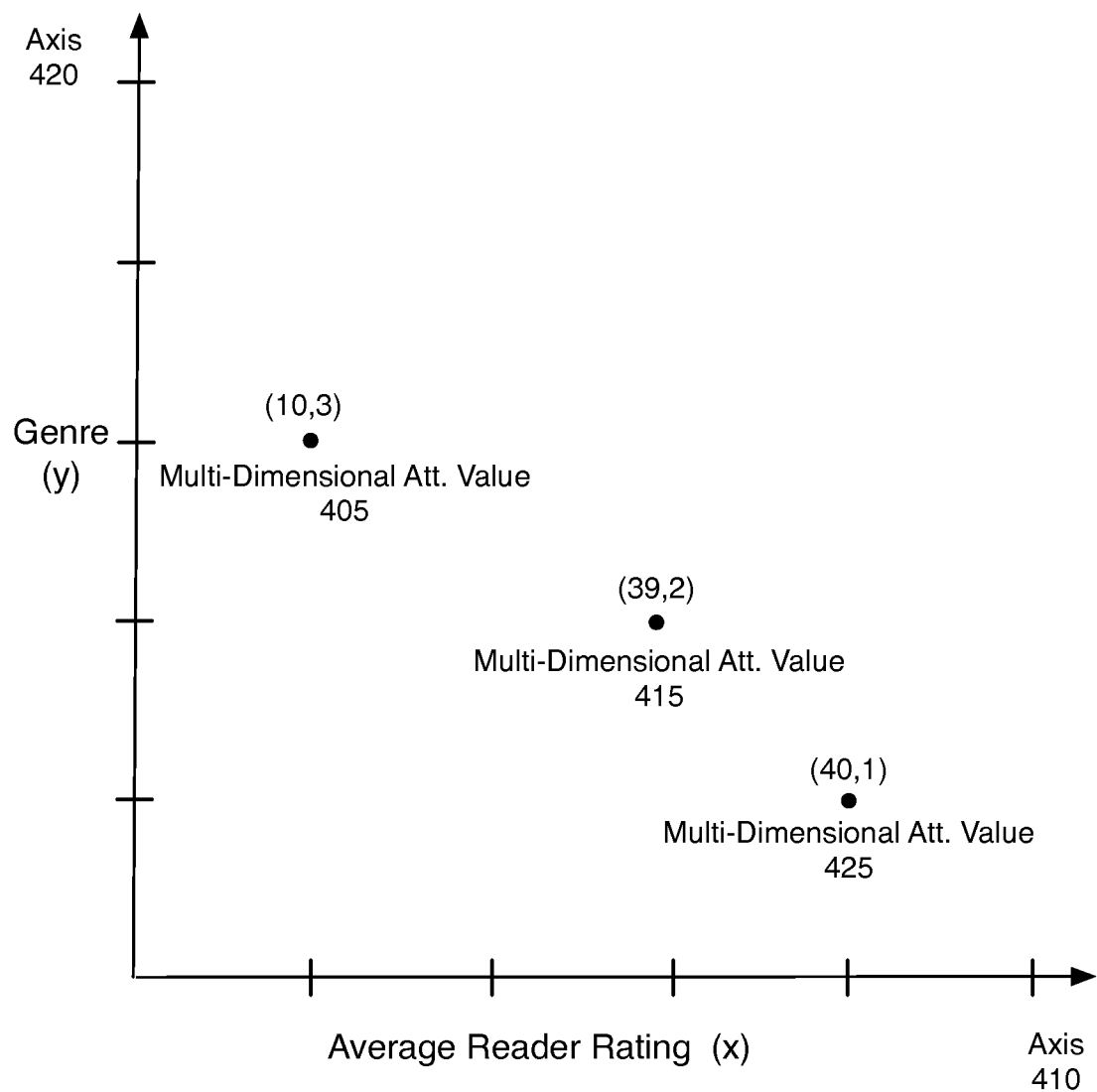
FIG. 4 illustrates a diagram of example multi-dimensional attribute values.

FIG. 4 illustrates a diagram of example multi-dimensional attribute values, arranged in accordance with at least some embodiments of the present disclosure. As shown in FIG. 4, three multi-dimensional attribute values are depicted on a map 400 as multi-dimensional attributes values 405, 415 and 425. According to some examples, these three multi-dimensional attribute values may each characterize a separate taste for a user of computing platform. The separate tastes, for example, may be for books purchased by the user at a venue. For these examples, as shown in FIG. 4, the separate tastes characterized by multi-dimensional attribute values 405, 415 and 425 may include two values. The first value may be based on an average reader rating of a given purchased book and the second value may be based on a genre of the given purchased book. Also, as shown in FIG. 4, the first value based on an average reader rating may be associated with axis 410 or (x) and the second value based on a genre may be associated with axis 420 or (y). As shown in FIG. 4, in some examples, axis 410 and axis 420 may be orthogonal to each other. Although not shown in FIG. 4, additional attributes may be plotted on other axes that may also be orthogonal to both axis 410 and axis 420 (e.g., a (z) axis).

In some examples, the first value based on average reader rating may be scaled to allow for the plotting of whole numbers on axis 410. A purchased book for multi-dimensional attribute 415, for example, may have an average reader rating based on a scale of 1 to 5. For this example, the purchased book for multi-dimensional attribute 415 may have an average rating of 3.9. The average rating of 3.9 may be scaled to a value of 39. Also, the second value based on genre may be based on assigning number values to a genre for the purchased book. For example, an adventure genre may have an assigned value of 1 and the genres of comic, fantasy, history, mystery and romance may have assigned values of 2, 3, 4, 5 and 6, respectively. For this example, the purchased book for multi-dimensional attribute 415 may be a comic genre. Hence, multi-dimensional attribute 415 may have a two-dimensional value that may be plotted or mapped to coordinates (39,2) on map 400 as shown in FIG. 4. Also, purchased books for multi-dimensional attributes 405 and 435 may have genres of fantasy (assigned value of 3) and adventure (assigned value of 1), respectively. These purchased books may also have average reader ratings of 1 and 4 scaled to 10 and 40 and may be plotted or mapped as shown in FIG. 4.

Figure 5:
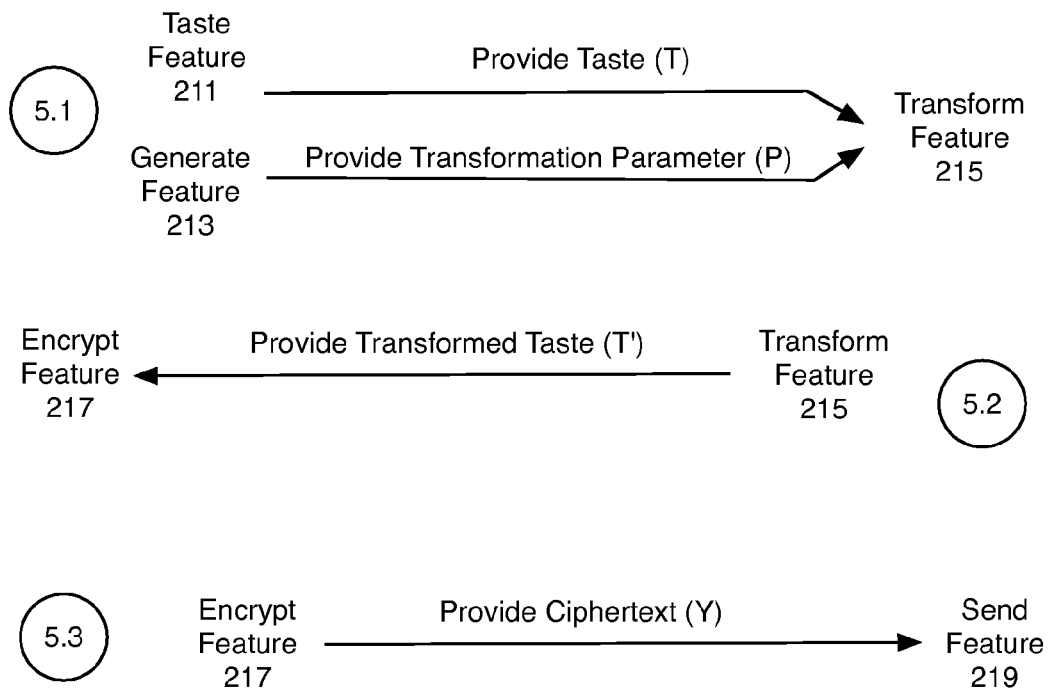
FIG. 5 illustrates an example fault-tolerant encryption scheme.

FIG. 5 illustrates an example fault-tolerant encryption (FTE) scheme 500, arranged in accordance with at least some embodiments of the present disclosure. In some examples, encryption manager 112 located with a computing device as shown in FIG. 1 or as described in FIG. 2 may include logic and/or features to implement at least portions of FTE scheme 500. But FTE scheme 500 is not limited to implementation by logic and/or features of encryption manager 112. Other logic and/or features included with or resident on a computing device may also implement at least a portion of FTE scheme 500.

Starting at example step 5.1 (Provide Taste (T); Provide Transformation Parameter (P)), taste feature 211 may provide a taste (T) related to an area of interest for a user of a computing platform (e.g., computing devices 110-1) and generate feature 213 may provide a transformation parameter (P). In some examples, T and P may each be provided to transform feature 215. The area of interest related to T, for example, may be purchased books purchased by the user of the computing platform. In some examples, T may be a multi-dimensional attribute value similar to the multi-dimensional attribute values shown in FIG. 4 (e.g., (39,2)). Also, for these examples, P may have been freshly generated by generate feature 213 and then provided to transform feature 215.

Moving to example step 5.2 (Provide Transformed Taste (T')), transform feature 215 may provide a transformed taste (T') to encrypt feature 217. According to some examples, transform feature 215 may transform the multi-dimensional attribute value of T into a one-dimensional attribute value of T' over a predefined finite field (F). In other words, T may be transformed into a one-dimensional discrete set T'?F using a noninvertible transform defined by P. The result of this transformation to T' may then be mapped into one-dimensional data.

Continuing to example step 5.3 (Provide Pseudonym and Session Key as Plain Text (X)), generate feature 213 may provide plain text (X) to encrypt feature 217. In some examples, generate feature 213 may generate a pseudonym to serve as a unique identifier for the computing platform (e.g., computing devices 110-1). For these examples, the pseudonym may be randomly generated. Also, generate feature 213 may also generate a session key. The session key may also be randomly generated. Generate feature 213, may combine or concatenate the pseudonym and the session key to form X. X may then be provided to encrypt feature 217.

Moving to example step 5.4 (Provide Ciphertext Y), encrypt feature 217 may provide ciphertext Y to send feature 219. In some examples, encrypt feature 217 may be configured to generate and provide Y based on the following parameters: k, r (k?r), over F. For these examples, X may be partitioned into k sections so that each section represents an element in F where F represents a finite field. A polynomial (f) over F with degree k−1 may be defined and f may have coefficients defined by these k values. Encrypt feature 217 may also be configured to evaluate each element in T' using f in order to obtain set (S)={(x, f(x)): x in T'}. Also, for these examples, encrypt feature 217 may be configured to generate a noise set (N)={(x,y): x is not in T', y!=f(x)} with r−|T'| elements. Encrypt feature 217 may then create or generate (S?N) as Y and then provide Y to send feature 219. According to some examples, send feature 219 may then send Y to a server communicatively coupled to the computing platform (e.g., venue server 120).

Figure 6:
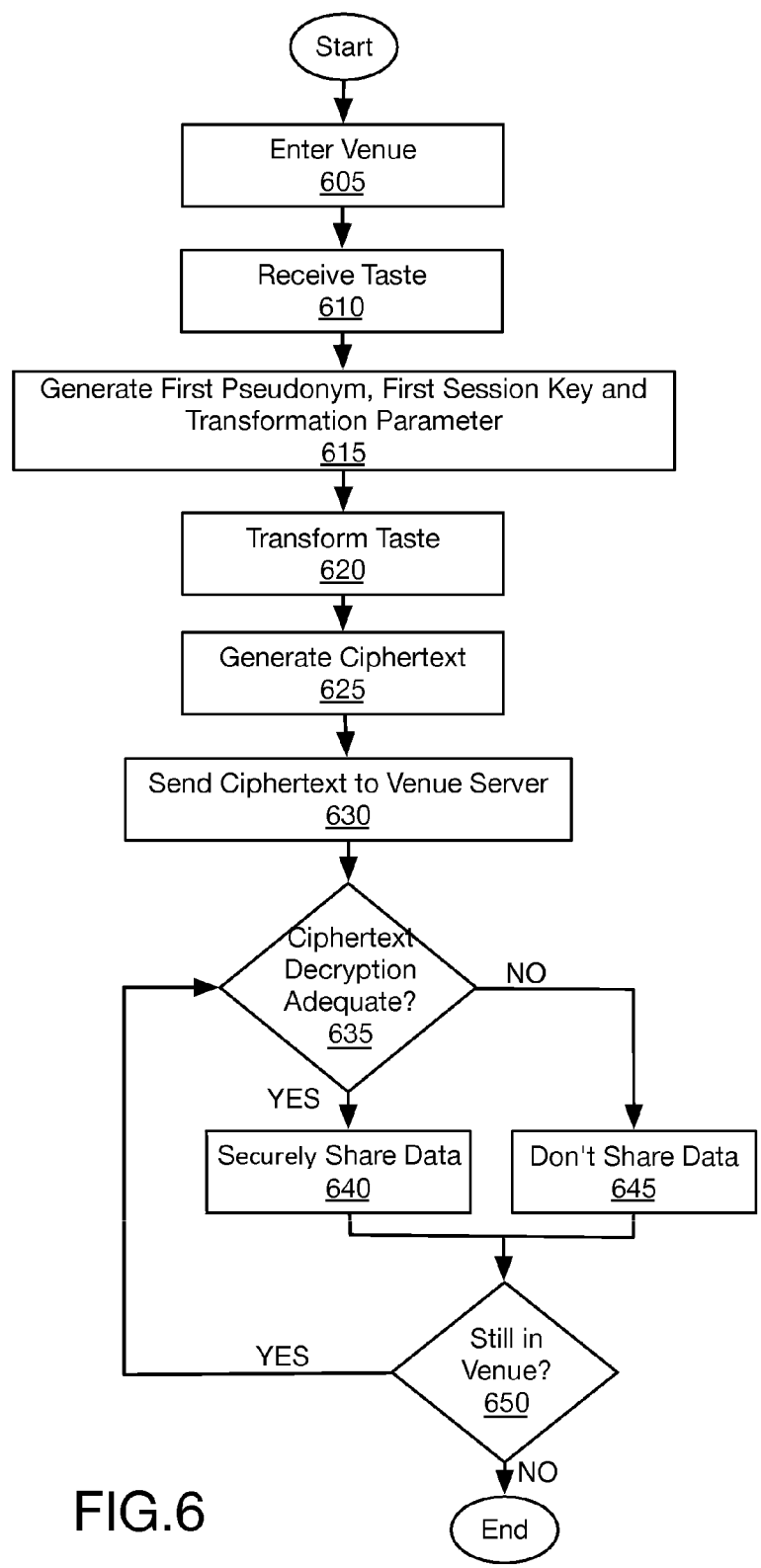
FIG. 6 illustrates a flow chart of example methods for encrypting a ciphertext and sending the ciphertext to a server.

FIG. 6 illustrates a flow chart of example methods for encrypting a ciphertext and sending the ciphertext to a server, arranged in accordance with at least some embodiments of the present disclosure. In some examples, elements of system 100 may be used to illustrate example methods related to the flow chart depicted in FIG. 6. Encryption manager 112 as shown in FIG. 2 may also be used to illustrate the example methods. But the described methods are not limited to implementations on system 100 or to encryption manager 112 shown in FIG. 2. The example methods may be implemented on other systems having one or more of the elements depicted in FIG. 1 or 2.

Moving from the start to block 605 (Enter Venue), a computing device such as computing device 110-1 may enter a venue. In some examples, computing device 110-1 may communicatively couple with venue server 120 via communication channel 140-1 upon entering the venue.

Proceeding from block 605 to block 610 (Receive Taste), encryption manager 112 located with computing device 110-1 may include logic and/or features configured to receive or obtain a taste related to an area of interest (e.g., via taste feature 211). In some examples, the taste may be related to an area of interest for a user of computing device 110-1. Also, the taste may be represented by a multi-dimensional attribute value such as the multi-dimensional attribute values described above for FIG. 4. If the user of computing device 110-1 desires to remain anonymous to venue server 120, the multi-dimensional attribute value for the taste may be received from application 116 resident at or with computing device 110-1. Otherwise, the multi-dimensional attribute value for the taste may be received from or through venue server 120.

Proceeding from block 610 to block 615 (Generate First Pseudonym, First Session Key and Transformation Parameter), encryption manager 112 may include logic and/or features configured to generate (e.g., via generate feature 213) a first pseudonym to at least temporarily identify computing device 110-1 and to also generate a first session key and a transformation parameter. For these examples, the first session key may be used with the first pseudonym to securely share data with other computing devices communicatively coupled with venue server 120.

Proceeding from block 615 to block 620 (Transform Taste), encryption manager 112 may include logic and/or features configured to transform the multi-dimensional attribute value for the received taste (e.g., via transform feature 215). According to some examples, the multi-dimensional attribute value may be transformed as described above for FTE scheme 500. For these examples the multi-dimensional attribute value may be transformed to a one-dimensional attribute value using the generated transformation parameter.

Proceeding from block 620 to block 625 (Generate Ciphertext), encryption manager 112 may include logic and/or features configured to generate a ciphertext (e.g., via encrypt feature 217). According to some examples, the ciphertext may be generated as described above for FTE scheme 500. For example, the transformed multi-dimensional attribute value may be used to generate the ciphertext.

Proceeding from block 625 to block 630, (Send Ciphertext to Server), encryption manager 112 may include logic and/or features configured to send the generated ciphertext to venue server 120 (e.g., via send feature 219). In some examples, the generated transformation parameter may also be sent to venue server 120. For these examples, venue server 120 may include logic and/or features to maintain the ciphertext and transformation parameter for computing device 110-1 with or at security information 124. Other computing devices from among computing devices 110-2 to 110-4 may be able to access the ciphertext and transformation parameter from venue server 120.

Proceeding from block 630 to decision block 635 (Ciphertext Decryption Adequate?), encryption manager 112 may include logic and/or features configured to determine whether requests to securely share data indicate whether the ciphertext that was sent to venue server 120 was adequately decrypted (e.g., via encrypt feature 217). As described in more detail below, the other computing devices may access the ciphertext and transformation parameter via venue server 120 and use the transformation parameter to attempt to decrypt the ciphertext and to determine a quality of the decryption. In some examples, if the ciphertext was adequately decrypted another computing device (e.g., computing device 110-2) may have relayed a second pseudonym and a second session key to computing device 110-1 that may be substantially similar to the first pseudonym and first session key originally generated by computing device 110-1. The second pseudonym and session key may also include a quality value to indicate the other computer's assessment of how similar its user's taste may be with that of computing device 110-1 user's taste. If the ciphertext was adequately decrypted (e.g., has a high quality value and/or the pseudonym and session key are correct) the process moves to block 640. Otherwise, the process moves to block 645.

Moving from decision block 635 to block 640 (Securely Share Data), encryption manager 112 may include logic and/or features to securely share data with the other computing device (e.g., via taste feature 211). In some examples, the shared data may relate to the area of interest for the use of computing device 110-1. The area of interest, for example, may be types of books, movies, songs, etc. that the user has purchased. For these examples, the data may either be stored in a memory maintained at computing device 110-1 or may be stored in memory accessible through computing device 110-1 (e.g., cloud or networked memory). Also, for some examples, the data may be securely shared via a separately established communication channel between the two computing devices. Alternatively, the data may be securely shared though venue server 120 via already established communication channels (e.g., communication channels 140-1 to 140-4).

Moving from decision block 635 to block 645 (Don't Share Data), encryption manager 112 may include logic and/or features to refuse to share data with the other computing device (e.g., via taste feature 211) due to an incorrect pseudonym or session key. Also, a low quality value compared to other quality values received from additional computing devices may lead to a refusal to share data with the other computing device. In some examples, requests to share data may be simply ignored. In other examples, a rejection message may be relayed to the other computing device.

Proceeding from either block 640 or block 645 to decision block 650 (Still in Venue?), encryption manager 112 may include logic and/or features to determine whether computing device 110-1 is still in the venue associated with venue server 120. In some examples, the user of computing device 110-1 may have powered down computing device 110-1. In other examples, the user may have terminated communication channel 140-1 with venue server 120. For the other examples, the terminated communication channel may have resulted from the user either leaving a virtual venue associated with venue server 120 (e.g., a website) or physically leaving a physical venue (e.g., a brick and mortar book store). If computing device 110-1 is still in the venue the process moves back to decision block 635. Otherwise, the process comes to an end.

Figure 7:
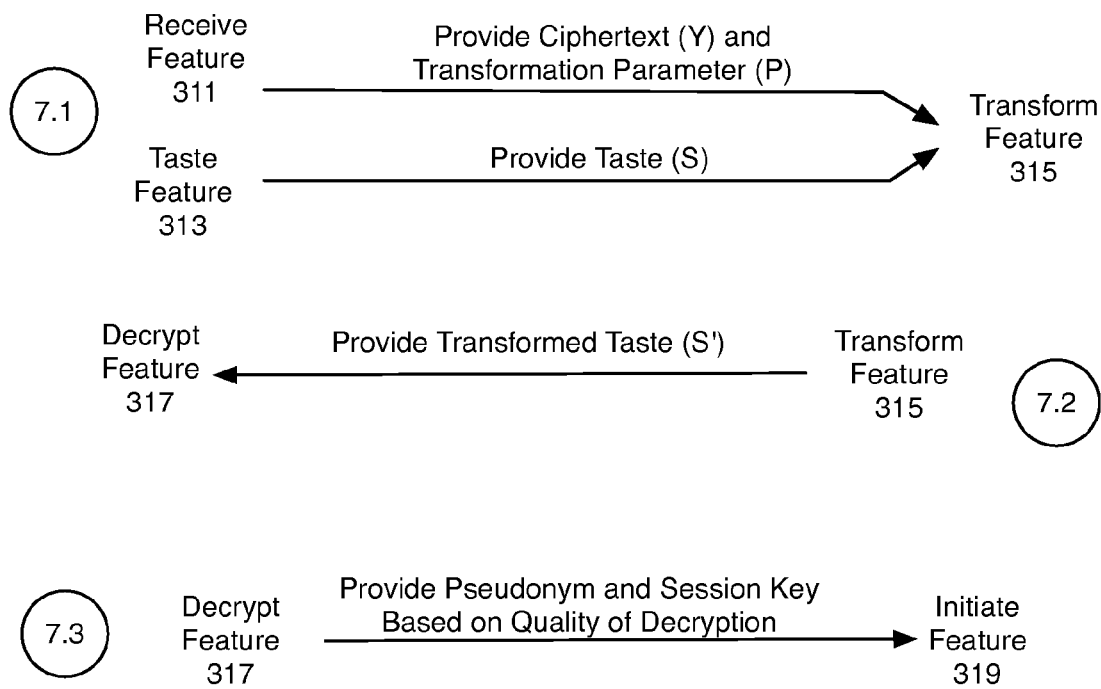
FIG. 7 illustrates an example fault-tolerant decryption scheme.

FIG. 7 illustrates an example fault-tolerant decryption (FTD) scheme 700, arranged in accordance with at least some embodiments of the present disclosure. In some examples, decryption manager 114 located with a computing device as shown in FIG. 1 or as described in FIG. 3 may include logic and/or features to implement at least portions of FTD scheme 700. But FTD scheme 700 is not limited to implementation by logic and/or features of decryption manager 114. Other logic and/or features included with or resident on a computing device may also implement at least a portion of FTD scheme 700.

Starting at example step 7.1 (Provide Ciphertext (Y) and Transformation Parameter (P); Provide Taste (S)), receive feature 311 may provide ciphertext (Y) and transformation parameter (P) and taste feature 313 may provide taste (S) related to an area of interest for a user of a computing platform (e.g., computing devices 110-4). In some examples, the Y and P may each have been received by receive feature 311 from venue server 120 and then provided to transform feature 315. Y and P, for example, may have been originally generated by logic and/or features at another computing device also communicatively coupled to venue server 120. The other computing device may have generated Y and P similar to the steps/ processes described above for FIG. 5 and FIG. 6. The other computing device may have then sent Y and P to be maintained at venue server 120. Also, for these examples, S may be provided to transform feature 315. The area of interest related to S, for example, may be books purchased by the user of the computing platform. In some examples, S may be a multi-dimensional attribute value similar to the multi-dimensional attribute values shown in FIG. 4 (e.g., (39,2).

Moving to example step 7.2 (Provide Transformed Taste (S')), transform feature 315 may provide a transformed taste (S') to decrypt feature 317. According to some examples, transform feature 315 may transform the multi-dimensional attribute value of S into a one-dimensional attribute value of S' over a predefined finite field (F). In other words, S may be transformed into a one-dimensional discrete set S'?F using a noninvertible transform defined by P. The result of this transformation to S' may then be mapped into one-dimensional data.

Continuing to example step 7.3 (Provide Pseudonym and Session Key Based on Quality of Decryption), decrypt feature 317 may provide a decrypted pseudonym and decrypted session key to initiate feature 319 based on an assessment of a quality of the decryption. In some examples, the pseudonym and session key are obtained from Y provided by receive feature 311 as described above. For these examples, the pseudonym may identify the other computing device and the session key may be used to initiate a security session with the other computing device. Encrypt feature 217 may be configured to determine the quality of the decryption of Y based on the following parameters: k, r (k?r), over F.

In some examples, if S for the user of the computing platform is similar to the taste (T) for the computing platform that originally generated Y, the results of a transformation applying the same P to S and T, i.e., S' and T', will be almost identical. For these examples, the quality determination process may include the following two step process:

Step 1: For each (x,y) in Y do
If x is not in S', eliminate (x,y) from Y.
Step 2: If possible
construct a polynomial g over F with degree k−1
so that g may cover a maximum number of points of the reduced Y.
Then gather k coefficients of g and construct a bit string Z.
Count the number Q of pairs (x,y) in the reduced Y that actually lie in g.
Output (Z, Q).
If this is not possible, output "decryption failure".

In some examples, the quality determination process may include eliminating from Y those points whose x coordinate is not in S'. For these examples, Y may initially contain random noise points as well as points (x,f(x)) which have been evaluated using all elements in set T' as x values. Also, if there are many overlapped values of S' and T', most of these noise points may be eliminated in the first step of the quality determination process. Also, many original function values (x, f(x)) shall remain. Step 2 of the quality determination process may include a process to reconstruct the curve by combining these ordered pairs (x,y) through Lagrange interpolation. However, if S' and T' do not match exactly and there may be a small difference between them, these errors may be removed for correct interpolation. For removing errors, decoding algorithms widely used in coding theory such as the Reed-Solomon algorithm may be used.

When decoding is successful or of adequate quality, polynomial g can be reconstructed. Polynomial g may be substantially similar to polynomial f described above for the generation of a ciphertext as described for FIG. 5. When S is very different from T, there may be a big difference in S' and T'. As a result of a big difference in S' and T', implementing step 2 of the quality determination process may eliminate many points over the polynomial g and many random noises shall remain. The presence of many random noises may result in a failure or an inadequate quality of the decoding.

In some examples, if the decryption was adequate or acceptable, an output (Z, Q) may result from the quality determination process. For these examples Z may include a plain text session key and a pseudonym to identify the other computing device and Q may include a quality value associated with the decryption. The value of Q may be based on the amount of random noise still remaining after implementing step 2. For example, high amounts of random noise equate to a lower value of Q and low amounts of random noise equate to a higher value of Q. Less amounts of random noise, as described above, may mean that S and T are substantially similar.

Figure 8:
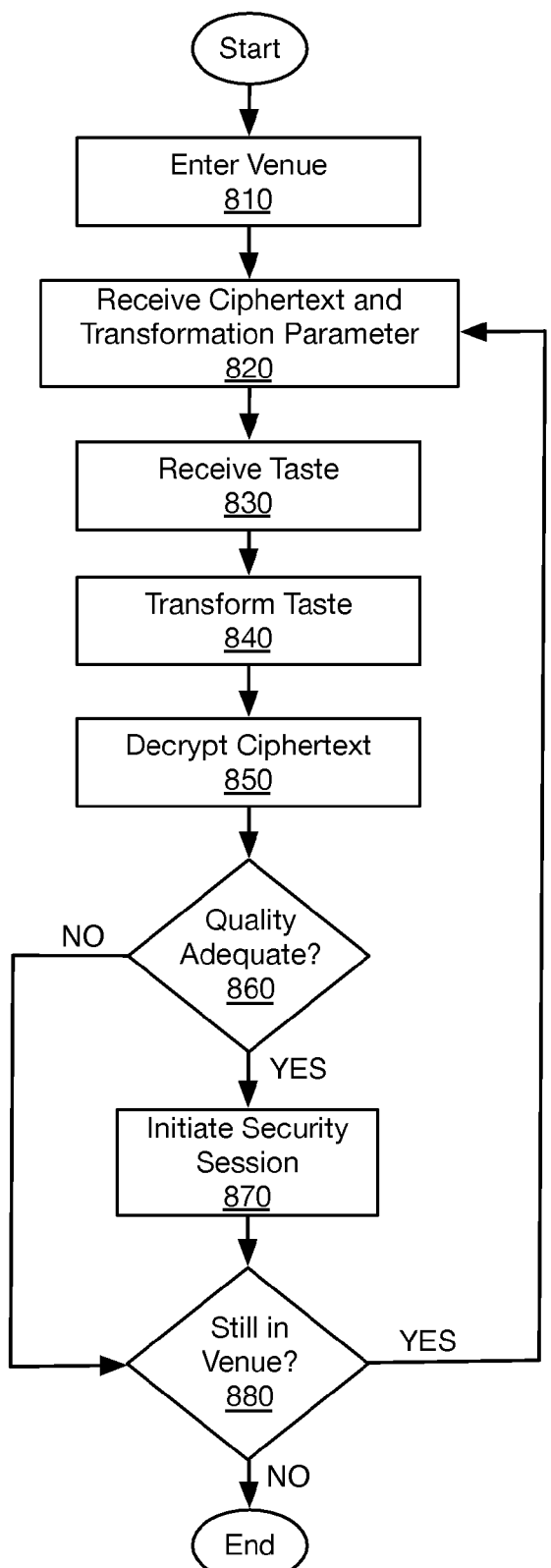
FIG. 8 illustrates a flow chart of example methods for decrypting a ciphertext and initiating a security session.

FIG. 8 illustrates a flow chart of example methods for decrypting a ciphertext and initiating a security session, arranged in accordance with at least some embodiments of the present disclosure. In some examples, elements of system 100 may be used to illustrate example methods related to the flow chart depicted in FIG. 8. Decryption manager 114 as shown in FIG. 3 may also be used to illustrate the example methods. But the described methods are not limited to implementations on system 100 or to decryption manager 114 shown in FIG. 3. The example methods may be implemented on other systems having one or more of the elements depicted in FIG. 1 or 3.

Moving from the start to block 810 (Enter Venue), a computing device such as computing device 110-4 may enter a venue. In some examples, computing device 110-4 may communicatively couple with venue server 120 via communication channel 140-4 upon entering the venue.

Proceeding from block 810 to block 820 (Receive Ciphertext and Transformation Parameter), decryption manager 114 located with computing device 110-4 may include logic and/or features configured to receive ciphertext and a transformation parameter (e.g., via receive feature 311). In some examples, the ciphertext and the transformation parameter may be received from venue server 120 via communication channel 140-4. For these examples, the ciphertext and the transformation parameter may have been sent to venue server 120 from another computing device also communicatively coupled to venue server 120 (e.g., computing device 110-1) and then maintained at venue server 120 (e.g., with security information 124).

Proceeding from block 820 to block 830 (Receive Taste), decryption manager 114 may include logic and/or features configured to receive or obtain a taste related to an area of interest (e.g., via taste feature 311). In some examples, the taste may be related to an area of interest for a user of computing device 110-4. Also, the taste may have or be represented by a multi-dimensional attribute value such as the multi-dimensional attribute values described above for FIG. 4. For these examples, computing device 110-4 does not include an application 116 and thus may depend on venue server 120 to provide the multi-dimensional attribute value for the taste.

Proceeding from block 830 to block 840 (Transform Taste), decryption manager 114 may include logic and/or features configured to transform the multi-dimensional attribute value for the received taste (e.g., via transform feature 315). According to some examples, the multi-dimensional attribute value may be transformed as described above for FTD scheme 700. For these examples, the multi-dimensional attribute value may be transformed to a one-dimensional attribute value using the generated transformation parameter.

Proceeding from block 840 to block 850 (Decrypt Ciphertext), decryption manager 114 may include logic and/or features configured to decrypt the received ciphertext (e.g., via decrypt feature 317). According to some examples, the ciphertext may be decrypted as described above for FTD scheme 700. For example, the transformed multi-dimensional attribute value may be used to decrypt the pseudonym and the session key from the received ciphertext using the one-dimensional attribute value.

Proceeding from block 840 to decision block 860 (Quality Adequate?), decryption manager 114 may include logic and/or features configured to determine whether the quality of the decrypted ciphertext is adequate (e.g., via decrypt feature 317). In some examples, the two-step quality determination process may be implemented as described above for FTD scheme 700 in order to determine whether the quality of the decryption is adequate. If the quality is adequate (e.g., little to no random noise remains), the process moves to block 870. Otherwise, the process moves to decision block 880.

Moving from decision block 860 to block 870 (Initiate Security Session), decryption manager 114 may include logic and/or features configured to initiate a security session (e.g., initiate feature 319) with the other computing device (e.g., computing device 110-1). In some examples, the security session may be initiated through sending the decrypted session key and the decrypted pseudonym to the other computing device. For some of these examples, already established communication channels with venue server 120 (e.g., communication channels 140-1 to 140-4) may be used to initiate the security session with the other computing device. In other examples, a separately established communication channel may be used to initiate the security session with the other computing device.

According to some examples, the other computing device may establish the security session based, at least in part, on the pseudonym and the session key substantially matching the originally encrypted pseudonym and session key. Once the security session has been established, computing device 110-4 may securely share data associated with the area of interest with the other computing device. The data may be securely shared via a separately established communication channel between the two computing devices or though venue server 120 via the already established communication channels (e.g., communication channels 140-1 to 140-4).

Proceeding from block 870 to decision block 880 (Still in Venue), decryption manager 114 may include logic and/or features configured to determine whether computing device 110-4 is still in the venue associated with venue server 120. In some examples, the user of computing device 110-4 may have powered down computing device 110-4. In other examples, the user may have terminated communication channel 140-4 with venue server 120. For the other examples, the terminated communication channel may have resulted from the user either leaving a virtual venue associated with venue server 120 (e.g., a website) or physically leaving a physical venue (e.g., a brick and mortar book store). If computing device 110-4 is still in the venue the process moves back to block 820. Otherwise, the process comes to an end.

FIG. 9 illustrates a block diagram of an example computer program product 900, arranged in accordance with at least some embodiments of the present disclosure. In some examples, as shown in FIG. 9, computer program product 900 includes a signal bearing medium 902 that may also include instructions 904 to be implemented at a first computing device. Instructions 904, which, when executed by logic (e.g., encrypt logic 210), may cause the logic to receive a first ciphertext and a transformation parameter from a server. A second computing device may have generated the ciphertext and the transformation parameter. The instructions 904 may also cause the logic to receive a first taste for a first user of the first computing device. The first taste may be related to an area of interest and may have a multi-dimensional attribute value. The instructions 904 may also cause the logic to transform the multi-dimensional attribute value for the first taste to a one-dimensional attribute value using the transformation parameter. The instructions 904 may also cause the logic to decrypt the first ciphertext using the one-dimensional attribute value in order to obtain a pseudonym identifying the second computing device and to obtain a session key to be used with the pseudonym to securely share data with the second computing device. In some examples, the instructions 904 may cause the logic to determine a quality of the decryption and initiate a security session with the other computing device to share data based, at least in part, on the determined quality of the decryption exceeding a threshold value.

Also depicted in FIG. 9, in some examples, computer program product 900 may include one or more of a computer readable medium 906, a recordable medium 908 and a communications medium 910. The dotted boxes around these elements depict different types of mediums included within, but not limited to, signal bearing medium 902. These types of mediums may distribute instructions 904 to be executed by logic (e.g., encrypt logic 210). Computer readable medium 906 and recordable medium 908 may include, but are not limited to, a flexible disk, a hard disk drive (HDD), a Compact Disc (CD), a Digital Versatile Disk (DVD), a digital tape, a computer memory, etc. Communications medium 910 may include, but is not limited to, a digital and/or an analog communication medium (e.g., a fiber optic cable, a waveguide, a wired communication link, a wireless communication link, etc.).

Figure 10:
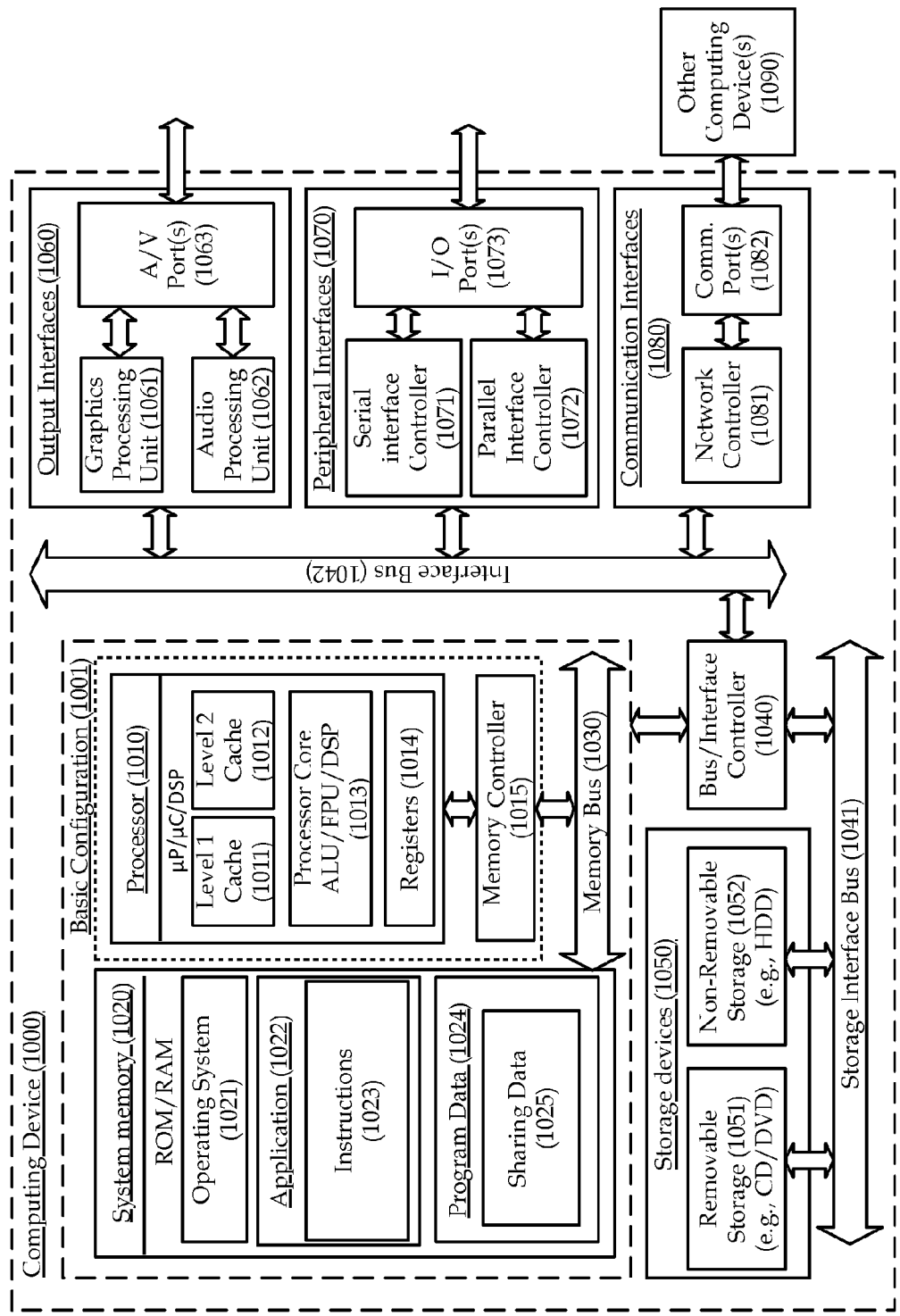
FIG. 10 illustrates an example computing device, all arranged in accordance with at least some embodiments of the present disclosure.

FIG. 10 illustrates an example computing device 1000, arranged in accordance with at least some embodiments of the present disclosure. In some examples, encryption manager 112 or decryption manager 114 depicted in FIG. 1, 2 or 3 may be implemented on computing device 1000. In these examples, elements of computing device 1000 may be arranged or configured to implement taste-based authentication in order to securely share data between computing devices. In a very basic configuration 1001, computing device 1000 typically includes one or more processors 1010 and system memory 1020. A memory bus 1030 can be used for communicating between the processor 1010 and the system memory 1020.

Depending on the desired configuration, processor 1010 can be of any type including but not limited to a microprocessor (µP), a microcontroller (µC), a digital signal processor (DSP), or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes instructions 1023 that are arranged to perform the functions as described herein including the actions described with respect to encryption manager 112 or decryption manager 114 architectures shown in FIG. 2 or 3 or including the actions described with respect to the schemes and flow charts shown in FIGS. 5-8. Program Data 1024 includes sharing data 1025 that is useful for implementing instructions 1023 (e.g., taste-based authentication to share data). In some examples, application 1022 can be arranged to operate with program data 1024 on an operating system 1021 such that implementations for instructions for implementing taste-based authentication in order to securely share data between computing devices may be provided as described herein. This described basic configuration is illustrated in FIG. 10 by those components within dashed line 1001.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000 (e.g., baseband representations of signals). Any such computer storage media can be part of device 1000.

Computing device 1000 can also include an interface bus 1042 for facilitating communication from various interface devices (e.g., output interfaces, peripheral interfaces, and communication interfaces) to the basic configuration 1001 via the bus/interface controller 1040. Example output interfaces 1060 include a graphics processing unit 1061 and an audio processing unit 1062, which can be configured to communicate to various external devices such as a display or speakers via one or more NV ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication interface 1080 includes a network controller 1081, which can be arranged to facilitate communications with one or more other computing devices 1090 over a network communication via one or more communication ports 1082. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
generating a first pseudonym to at least temporarily identify a first computing device associated with a user having a taste related to an area of interest, the taste having a multi-dimensional attribute value configured to characterize the taste associated with the user and the multi-dimensional attribute value comprising at least two values;
generating a first session key to be used with the first pseudonym to securely share data maintained on the first computing device with one or more other computing devices;
generating a transformation parameter;
transforming the multi-dimensional attribute value for the taste to a one-dimensional attribute value using the transformation parameter;
encrypting the first pseudonym and the first session key using the one-dimensional attribute value in order to generate a ciphertext; and
sending the ciphertext and the transformation parameter to a server accessible to both the first computing device and the one or more other computing devices, wherein the server maintains the first ciphertext and the transformation parameter,
wherein a first value of the at least two values of the multi-dimensional attribute value represents a user rating and wherein a second value of the at least two values of the multi-dimensional attribute value represents a genre.

2. The method of claim 1, further comprising: receiving a second pseudonym and a second session key from a second computing device from among the one or more other computing devices; and
establishing a security session with the second computing device based on the second pseudonym being substantially similar to the first pseudonym and based on the second session key being substantially similar to the first session key.

3. The method of claim 1, wherein the first value is associated with a first axis and the second value is associated with a second axis, the first axis being orthogonal to the second axis.

4. The method of claim 3, wherein transforming the multi-dimensional attribute value for the taste to a one-dimensional attribute value using the transformation parameter comprises transforming the multi-dimensional value to a one-dimensional attribute value over a predefined finite field and mapping the one-dimensional attribute value to a single axis.

5. The method of claim 1, wherein generating the transformation parameter comprises generating a fresh transformation parameter in response to establishing and completing a security session with a second computing device from among the one or more computing devices, the established and completed security session to include the sharing of data associated with the area of interest.

6. The method of claim 1, wherein encrypting the first pseudonym and the first session key using the one-dimensional attribute value includes implementing at least a portion of a fault tolerant encryption scheme to generate the ciphertext.

7. The method of claim 1, wherein the taste having a multi-dimensional attribute value comprises the multi-dimensional attribute value being provided to the first computing device from the server accessible to both the first computing device and the one or more other computing devices, the multi-dimensional attribute value to be based, at least in part, on information associated with the user.

8. An apparatus
comprising: a processor; and
an encryption manager having logic, the logic configured to:
   generate a first pseudonym to at least temporarily identify a first computing device associated with a user having a taste related to an area of interest, the taste having
a multi-dimensional attribute value configured to characterize the taste associated with the user and comprising at least two values;
   generate a first session key to be used with the first pseudonym to securely share data maintained on the first computing device with one or more other computing devices;
   generate a transformation parameter;
   transform the multi-dimensional attribute value for the taste to a one-dimensional attribute value using the transformation parameter;
   encrypt the first pseudonym and the first session key using the one-dimensional attribute value in order to generate a ciphertext; and
   send the ciphertext and the transformation parameter to a server accessible to both the first computing device and the one or more other computing devices, wherein the server maintains the ciphertext and the transformation parameter,
   wherein a first value of the at least two values of the multi-dimensional attribute value represents a user rating and wherein a second value of the at least two values of the multi-dimensional attribute value represents a genre.

9. The apparatus of claim 8, further comprising the logic configured to:
   receive a second pseudonym and a second session key from a second computing device from among the one or more other computing devices; and
   establish a security session with the second computing device based on the second pseudonym being substantially similar to the first pseudonym and based on the second session key being substantially similar to the first session key.

10. The apparatus of claim 9, wherein to establish the security session with the second computing device comprises the logic configured to share data associated with the area of interest.

11. The apparatus of claim 10, wherein the first value is associated with a first axis and the second value is associated with a second axis, the first axis being orthogonal to the second axis.

12. The apparatus of claim 11, wherein to transform the multi-dimensional attribute value for the taste to a one-dimensional attribute value using the transformation parameter comprises the logic configured to transform the multi-dimensional value to a one-dimensional attribute value over a predefined finite field and the logic also configured to map the one-dimensional attribute value to a single axis.

13. The apparatus of claim 8, wherein to encrypt the first pseudonym and the first session key using the one-dimensional attribute value includes the logic configured to implement at least a portion of a fault tolerant encryption scheme to generate the ciphertext.

* * * * *

UNITED STATES PATENT AND TRADEMARK OFFICE
CERTIFICATE OF CORRECTION

| | | |
|---|---|---|
| PATENT NO. | : 9,246,673 B2 | Page 1 of 1 |
| APPLICATION NO. | : 13/703133 | |
| DATED | : January 26, 2016 | |
| INVENTOR(S) | : Lee | |

It is certified that error appears in the above-identified patent and that said Letters Patent is hereby corrected as shown below:

In the specification,

In Column 1, Line 8, delete "§371" and insert -- § 371 --, therefor.

In Column 17, Line 55, delete "NV ports" and insert -- A/V ports --, therefor.

Signed and Sealed this
Nineteenth Day of July, 2016

Michelle K. Lee
*Director of the United States Patent and Trademark Office*